C. H. QUACKENBUSH AND J. C. SMEDLEY.
APPARATUS FOR DRAWING GLASS CANE AND GLASS TUBING.
APPLICATION FILED APR. 29, 1916.
1,325,265.
Patented Dec. 16, 1919.
4 SHEETS—SHEET 1.
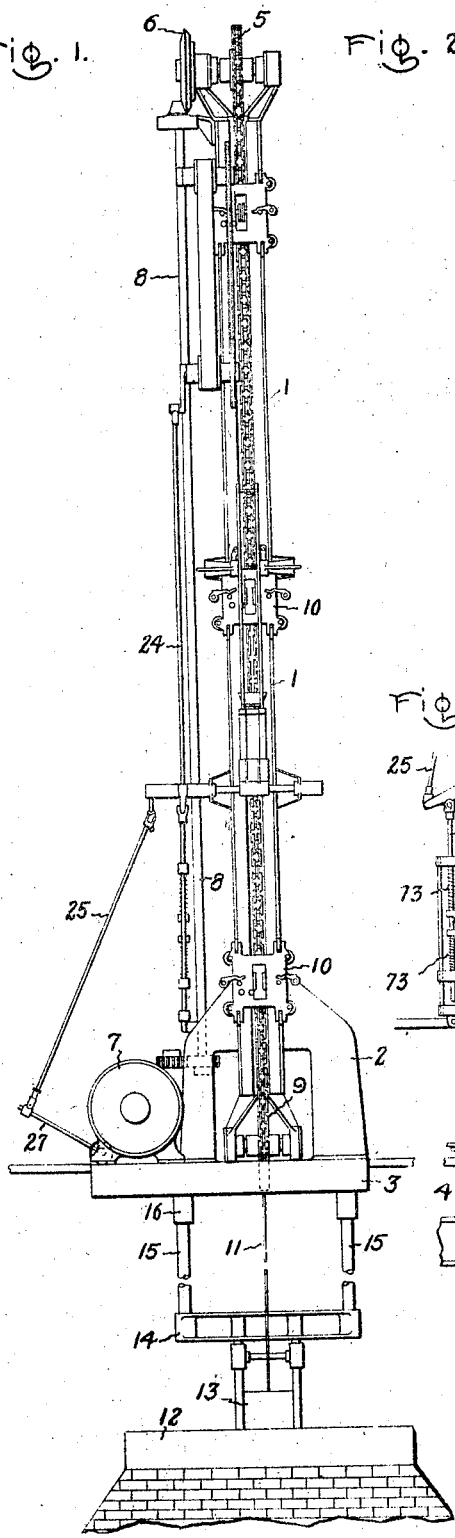
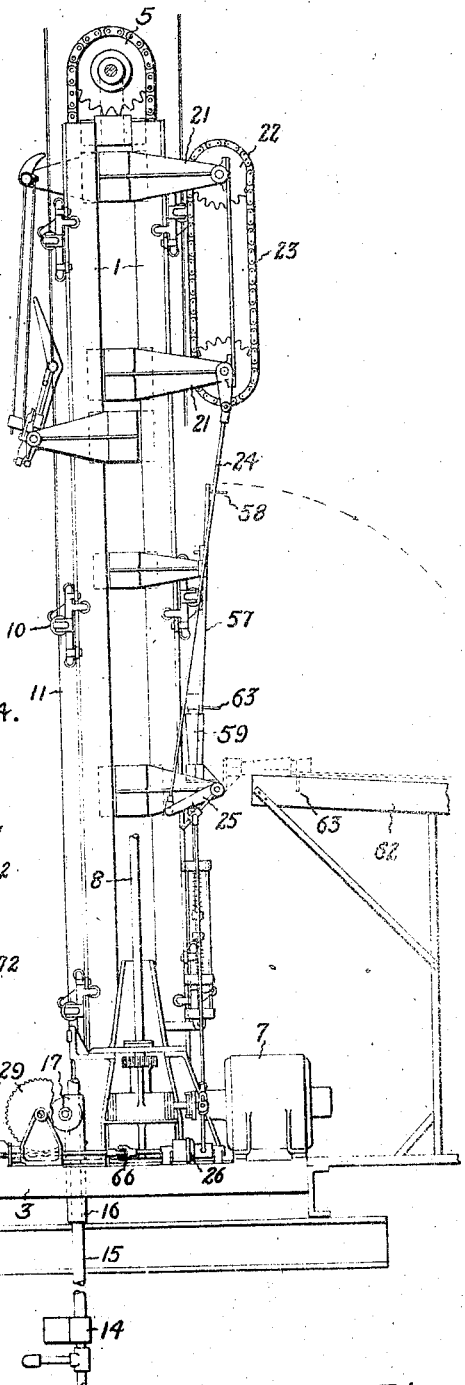
INVENTORS:
CLEVELAND H. QUACKENBUSH,
JAMES C. SMEDLEY,
BY
THEIR ATTORNEY.

C. H. QUACKENBUSH AND J. C. SMEDLEY.
APPARATUS FOR DRAWING GLASS CANE AND GLASS TUBING
APPLICATION FILED APR. 29, 1916.
1,325,265.
Patented Dec. 16, 1919.
4 SHEETS—SHEET 2.
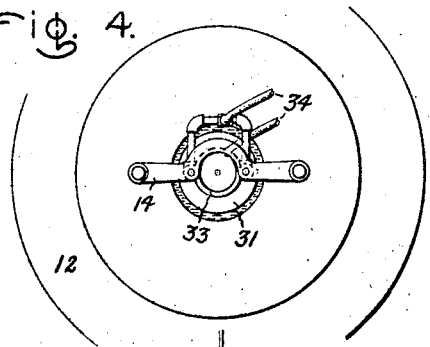
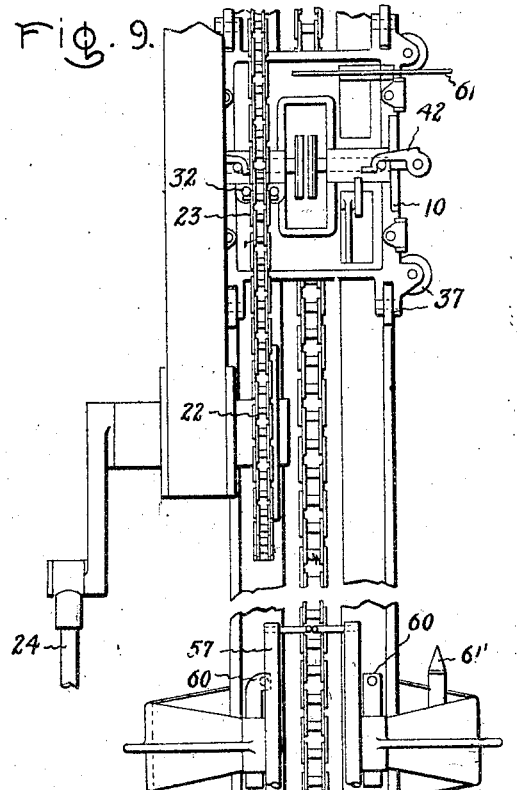
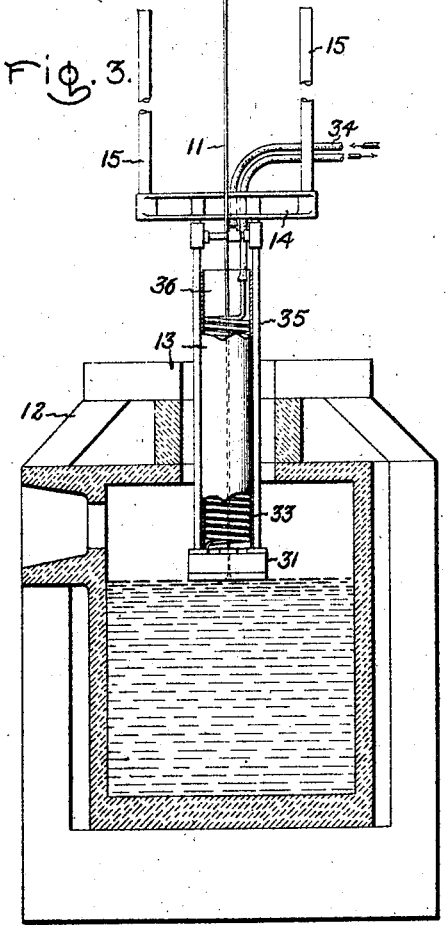
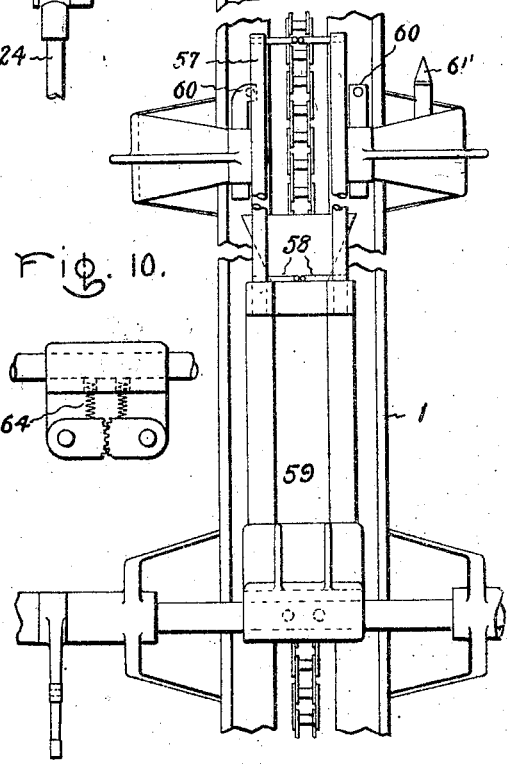
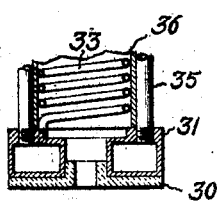
INVENTORS:
CLEVELAND H. QUACKENBUSH,
JAMES C. SMEDLEY,
BY Albert G. Davis
THEIR ATTORNEY

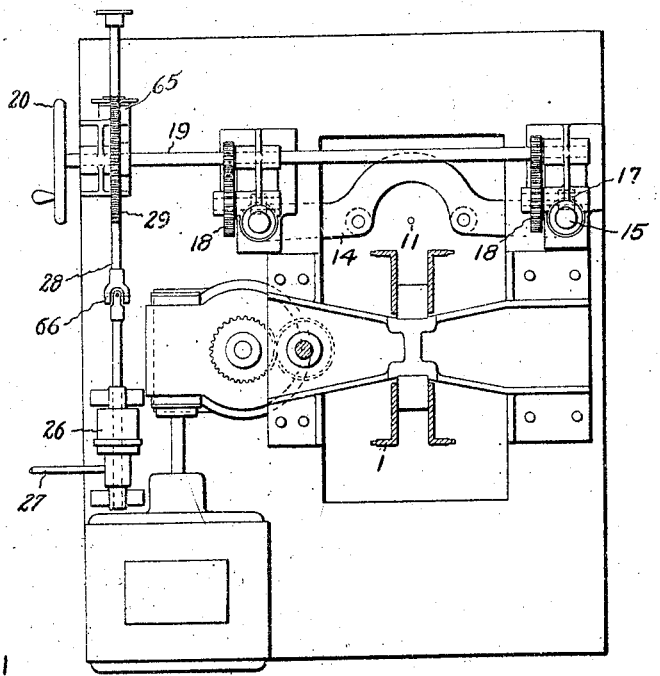
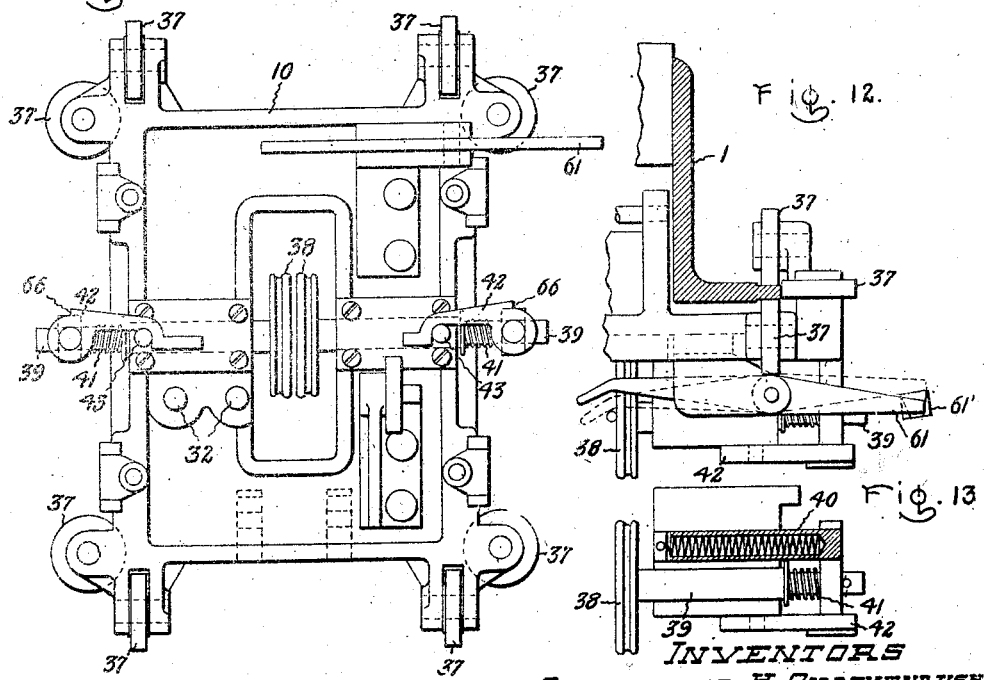

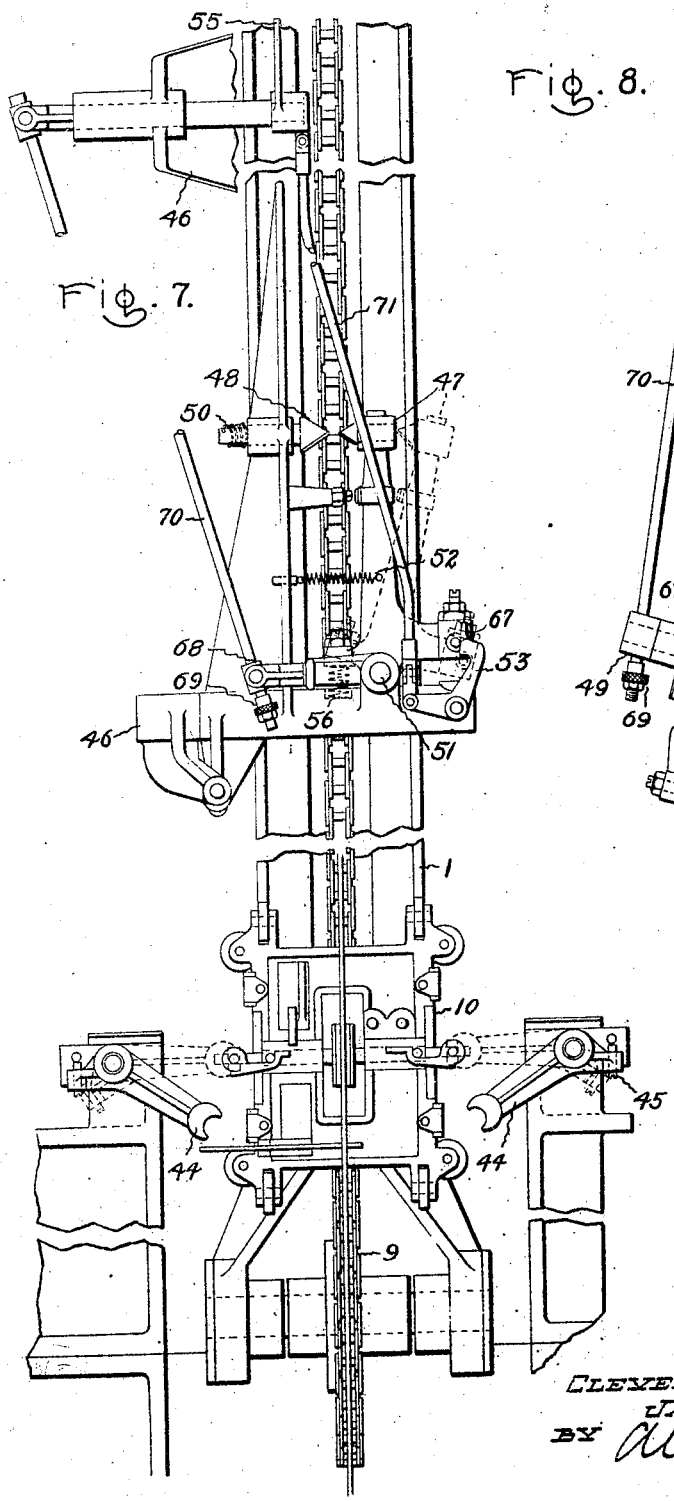

UNITED STATES PATENT OFFICE.

CLEVELAND H. QUACKENBUSH AND JAMES C. SMEDLEY, OF CLEVELAND, OHIO, ASSIGNORS TO GENERAL ELECTRIC COMPANY, A CORPORATION OF NEW YORK.

APPARATUS FOR DRAWING GLASS CANE AND GLASS TUBING.

1,325,265.   Specification of Letters Patent.   Patented Dec. 16, 1919.

Application filed April 29, 1916. Serial No. 94,463.

*To all whom it may concern:*

Be it known that I, CLEVELAND H. QUACKENBUSH and JAMES C. SMEDLEY, citizens of the United States, residing at Cleveland, county of Cuyahoga, State of Ohio, have invented certain new and useful Improvements in Apparatus for Drawing Glass Cane and Glass Tubing, of which the following is a specification.

Our invention relates to the art of drawing glass, and more particularly to apparatus for drawing cane glass and tubing in a continuous manner.

We have made valuable improvements in the cane glass drawing machine described in pending application, Serial No. 771,407, filed June 3, 1913, John T. Fagan, and these improvements combined with other novel features hereinafter described result in a machine of simple construction and more reliability and efficiency in operation whereby cane glass of more uniform dimensions may be produced with great facility and with minimum breakage.

An important feature of our invention resides in an improved cooling or chilling apparatus, and in accordance therewith the cooling device, which is located adjacent the working level of the molten glass, is caused to follow automatically the descending working level as the glass is drawn out. Specifically, the lowering devices operate in an intermittent manner, and the rate of downward feed may be regulated to a nicety by varying the extent of the intermittent movements. The grippers, which travel upwardly and downwardly, actuate these lowering devices. This arrangement avoids the use of variable ratio gears in a continuous feed type of lowering devices.

We have also devised a new and improved cooling device whereby an even and unchanging temperature is maintained in the neighborhood of the drawn glass issuing from the working level of the container. The cooling device preferably surrounds the cane glass and extends a considerable distance above the working level, thereby forming an extended cooling chamber.

While we have illustrated our invention as applied to a cane glass drawing machine of the type described in the pending Fagan application above referred to, it is understood that the improvements are not necessarily limited thereto, except as will be specifically pointed out in the following description and attached claims.

Figure 1 is a front elevation of the drawing apparatus; Fig. 2 is a side elevation; Fig. 3 is an elevation of the cooling ring and glass pot partially in section; Fig. 4 is a plan view of same; Fig. 5 is a plan view of the machine showing lowering mechanism for the cooling ring; Fig. 6 is a sectional view of the lower end of the cooling ring and graphite plate; Fig. 7 is an enlarged elevation from the rear of the machine, showing the closing fingers for the gripping attachment and the knives for cutting the glass in sections; Fig. 8 is a side view of the cutters; Fig. 9 is a front elevation showing the delivery mechanism; Fig. 10 is a plan view of the conveyer; Fig. 11 is an elevation of the carriage; Figs. 12 and 13 are details of same; and Fig. 14 is a detail showing braking means for conveyer.

Referring to the drawings, a central standard 1, having supporting legs 2, is carried by a framework 3 resting on cross-beams 4. The central standard carries at its top a sprocket 5, journaled between two diverging brushes, and at its bottom end a sprocket 9 which is journaled between two arms extending downwardly between legs 2. On these sprockets runs an endless chain conveyer carrying drawing and gripping devices 10, which operate continuously to grip and draw the cane glass 11 upwardly from the working level of the molten glass contained in a receptacle 12, as will appear more in particular hereinafter.

The power apparatus comprises a motor 7, mounted on the framework 3, which drives the chain conveyer through intermediate gearing consisting of two countershafts 8 and a bevel pinion 6 fixed to the overhanging shaft of sprocket 5. The countershafts 8 carry suitable pinions meshing with each other and also suitable pinions meshing with bevel 6 and a worm (not shown) on the shaft of the motor.

Referring particularly to Figs. 3 and 4, the framework 3 carries an adjustable cooling or chilling device 13, mounted on a cross-head 14. The cross-head 14 bridges two vertical rack bars 15, which pass upwardly through stationary sleeves 16 and mesh with small pinions 17 (Figs. 2 and 5). These pinions 17 are suitably journaled and on the same shaft therewith are fixed two larger pinions 18 which in turn mesh with pinions fixed to a shaft 19 carrying a handwheel 20. By turning the handwheel 20 and shaft 19, chilling devices 13 may be accurately adjusted vertically in either direction through the intermediate gearing 17, 18 and rack bars 15.

The central standard also carries at right angles thereto two brackets 21 on the outward ends of which are journaled two sprockets 22 carrying an endless chain 23. On the shaft of the lower sprocket is fixed a crank arm which is connected by means of a connecting rod 24 to a bell-crank lever 25. This bell-crank lever in turn is connected with a pawl and ratchet mechanism 26, through a suitable connecting rod and lever 27 (Figs. 1 and 5). The ratchet device 26 drives intermittently, as will hereinafter be described, a shaft 28, whose movement is transmitted to shaft 19 through a pinion 29 fixed thereto and meshing with a worm gear on shaft 28. The operation of the adjusting feature of our invention is as follows: Assuming that the container 12 has a supply of molten glass and is brought into working relation with the drawing apparatus, the cooling device 13 is lowered, by means of hand-wheel 20 and intermediate gearing 17, 18, downwardly through an opening in the top of the container until the bottom (consisting of a refractory shield 30, Fig. 6,) of the cooling device is in proximity to or touches the surface of molten glass as indicated in Fig. 3. It was found that this adjustment produced the best results in the drawn glass. The driving motor 7 is then started, which proceeds to drive the drawing apparatus causing the gripping device 10 to travel up and down. As each gripping device passes over the top of the standard and starts on its downward path it engages the chain 23 by means of two pins 32 and proceeds to drive the sprockets 22, during the time the device is passing the two sprockets. The arrangement is such that the two pins 32 are in engagement with chain 23 just long enough to impart one complete revolution to lower sprocket 22 and this results in one complete to and fro movement of ratcheting device 26, the movement of the lower sprocket 22 being transmitted as heretofore indicated through a connecting rod 24, bell-crank lever 25 and ratcheting lever 27. The operation of the ratcheting device causes a predetermined downward feeding movement of the cooling device 13, this predetermined movement having been previously adjusted to correspond exactly to the fall of the working level of the molten glass in the container 12. The adjustment can be made by varying the effective length of the lever 27 or by adjusting the effective length of the arm of bell-crank lever 25 which is connected to lever 27 through a connecting rod.

The cooling device consists of a hollow ring 31 and a coiled pipe 33 extending upwardly from the ring, the coiled pipe and ring being connected in series and supplied with a cooling fluid, preferably water, by means of flexible pipes 34. The ring 31 communicates with the incoming flexible pipe 34 through two parallel pipes 35, the latter serving as supports for the ring and carrying a cylindrical shield 36 around the interior of which is disposed the cooling coil 33. The cooling coil 33 extends upwardly a considerable distance from the cooling ring 31 and forms a long cylindrical cooling surface embracing or surrounding the drawn glass 11 issuing from the container. This results in an extended cooling chamber of even and unvarying temperature whereby drawn glass of uniform and regular dimensions is obtained.

The gripping devices 10 have suitable rollers 37 adapted to follow guide-ways formed on the central standard which force the grippers to follow straight and confined paths notwithstanding any lost motion in the chain conveyer. The gripping jaws 38 have yielding faces, as asbestos, and are mounted upon the opposing ends of two plungers 39 sliding into alined guide-ways. Each plunger 39 carries spaced therefrom a cylindrical guide 40 (Fig. 13) sliding in a suitable guide-way. The gripping jaws are usually held out of gripping relation by springs 41 encircling the plungers 39 and playing between shoulders on the outer ends of the plungers and the outer ends of the guide-ways, assisted by additional springs playing in cylindrical guides 40. By compressing the springs 41 the jaws 38 may be brought into gripping relation and in the gripping position pivoted latches 42 mounted on the plungers are adapted to engage pins 43 formed on the guide-ways for the purpose of locking the gripping jaws in gripping relation. The gripping is brought about by suitable actuating cams mounted on the stationary framework and these preferably consist of pivoted actuating arms 44 (Fig. 7), the free ends of which are adjusted by means of set screws 45 to engage the outer ends of plungers 39 and latches 42 and set the grippers, as the devices 10 round the lower end of the standard and begin their upward journey. The arms 44 engage shoulders 66 on latches 42 at the same time the springs 42 are compressed and thereby urge latches 42 upwardly into engaging relation with pins 43.

The cutting or breaking devices for cutting the drawn glass into sections are mounted in stationary brackets 46 at right angles to the central standard and are best illustrated in Figs. 7 and 8. The cutters 47 and 48 embrace the cane glass 11 but are mounted on a trunnion 49 on the lower bracket 46 for swinging outwardly out of the path of the ascending grippers 10 against the tension of a spring 50. The cutter 47, as shown in dotted lines in Fig. 7, is adapted to be swung away from cutter 48 on a pivot 51 against the tension of a spring 52 and there locked in position by a latch 53 engaging a shoulder on pin 67 on an arm projecting rearwardly from cutter 47. As the grippers ascend they engage the cam surface 54 of cutter 48 support and cause the cutters to swing outwardly out of the way against the tension of spring 50. This outward swinging movement of the cutting devices causes an arm 68 projecting from cutter 47 to engage an adjustable stationary nut 69 on a rod 70, thereby simultaneously turning cutter 47 on its pivot 51, and the cutter 47 is locked against tension of spring 52 in cutting position by latch 53. The rod 70 is attached to the upper bracket 46 and passes through a sleeve on arms 68. As the grippers continue they ride off the cam surface 54 and hence permit the cutting device to swing back to position shown in Fig. 8, wherein the cutters 47 and 48 again embrace the drawn glass 11, the cutter 47 still being in cutting position shown in dotted lines in Fig. 7. Finally the gripper reaches the point where it engages a trigger 55 and through a connecting rod 71 trips latch 53 to free the cutter 47. The cutter 47 under the influence of spring 52 thereupon delivers in coöperation with the relatively stationary cutter 48 a hammer blow or sharp cutting impact to the glass rod 11, thereby severing the cane in a sure and certain manner at the exact point desired. The latter part of the cutting stroke takes place against the compression of a spring 56 which rests under a heel of the arm carrying the cutter 47. This causes an immediate slight withdrawal of the cutter 47 from cutter 48 after the cutting stroke, the normal separation being sufficient to permit the cane glass to pass freely therebetween without hindrance.

The severed sections of cane glass are carried on over the top of the standard by the grippers 10 and each gripper by engaging the chain 23 as hereinbefore described causes one complete turn of lower sprocket 22. This complete turn of the sprocket causes the section of cane glass carried by the preceding gripper to be delivered to a suitable receptacle 62, as will now be described. The delivery mechanism comprises two parallel arms 57 which are carried by a shaft fixed to bell-crank lever 25 and at each operation of the lever are caused to swing over into the dotted position shown in Fig. 2 and back again to the position shown in full lines. The parallel arms have interlock fingers 58 near either end and their lower ends terminate in a receptacle like member 59 (in the form of an open ended trough) located in the path of the descending cane glass section. Just before the cane glass reaches the receptacle the gripping jaws 38 are caused to release the cane by means of stationary fingers 60 which project into the path of latches 42 and engage therewith to release the lock and the gripping jaws at the point desired. The release takes place approximately at the same time the succeeding gripper 10 engages chain 23 to drive sprocket 22, and hence the parallel arms 57 begin their delivery movement immediately after the release of the cane glass section. Upon release the section falls upon fingers 58, or may be caused to fall thereon by means of a pivoted finger 61 which is mounted on the gripper back of the cane and adapted to come into engagement with a stationary cam 61' to deliver a slight outward blow to the section. Upon reaching the horizontal position the fingers 58 are caused to open up and permit the cane section to fall into a suitable receptacle 62, this being accomplished by imparting a slight rotary movement to one or both of parallel arms 57. A finger 63 coming into engagement with the receptacle 62 causes this rotary movement against tension of a spring 64.

It is to be noted that a slidable sleeve 65, having a cam surface for the purpose, is adapted to slide on the outer end of shaft 28 and bring the same into mesh with pinion 29, a gimbal joint 66 being provided in the shaft for allowing the outer end thereof to fall out of mesh.

Referring to Fig. 14, to one arm of bell-crank lever 25 is fixed a downwardly extending rod 71' which slides through two spaced guides 72 pivotally mounted on a supporting arm extending from the central standard. The rod carries two collars located between the guides, and between each collar and adjacent guide is interposed a buffer spring 73 encircling the rod. The collars and guides are so adjusted that the lower spring is compressed in the lowermost position of bell-crank 25, while the upper one is under compression in upper position of bell-crank 25. The purpose of this arrangement is to steady the operation of the delivery mechanism and compensate for any lost motion in chain 23, thereby eliminating breakages due to lost motion and unsteadiness in operation.

The drawing may be initially started in the usual manner by lowering a bait through the cooling device 13 into the container and carefully drawing the same upwardly until the drawing devices begin to perform their functions.

It has been found that the combined improvements in this machine have resulted in cane glass of more uniform section than it has been possible to draw heretofore, and moreover the breakage and consequent waste have been reduced to a minimum notwithstanding a much greater production per unit of time.

While we have set forth our invention in the specific manner required by the patent statutes, it is to be understood that our improvements are capable of assuming other forms than those illustrated. For instance, where the term "cane glass" appears in the specification and claims, it is understood to cover "tubing" and other drawn glass articles in the drawing of which similar problems arise.

What we claim and desire to secure by Letters Patent of the United States, is:—

1. An apparatus for drawing glass cane or tubing comprising a receptacle containing molten glass, a plurality of gripping devices caused to travel successively up and down with reference to the container and adapted to draw the molten glass into cane or tubing, an adjustable cooling or chilling device located near the working level and adjacent the drawn glass issuing from the container, and automatic means actuated by the gripping devices for feeding the cooling device downwardly as the working level descends due to depletion of the molten glass.

2. An apparatus for drawing glass cane or tubing comprising a receptacle containing molten glass, a plurality of gripping devices caused to travel successively up and down with reference to the container and adapted to draw the molten glass into cane or tubing, an adjustable cooling or chilling device located near the working level and surrounding the glass issuing from the container, and automatic means actuated by each device as it passes a certain point for feeding the cooling device downwardly as the working level descends.

3. An apparatus for drawing glass cane or tubing comprising a receptacle containing molten glass, a plurality of gripping devices caused to travel successively up and down with reference to the container and adapted to draw the molten glass into cane or tubing, an adjustable cooling or chilling device located near the working level and surrounding the cane glass issuing from the container, and means located near the working level and surrounding the cane glass issuing from the container, and means located in the path of the gripping device for feeding the cooling device downwardly as the working level descends.

4. An apparatus for drawing glass cane or tubing comprising a receptacle containing molten glass, a plurality of gripping devices caused to travel successively up and down with reference to the container and adapted to draw the molten glass into cane or tubing, an adjustable cooling or chilling device adapted to be lowered into the container and in working relation with the cane or tubing issuing from the molten glass, and means located in the path of the gripping devices for lowering the chilling device as the working level descends.

5. An apparatus for drawing glass cane or tubing comprising a receptacle containing molten glass, a vertically adjustable supporting head adapted to be lowered into and removed from the container, cooling coils mounted upon the head and adapted to surround the cane or tubing issuing from the container, ratchet devices for lowering the head, a plurality of gripping devices caused to travel successively up and down with reference to the container and adapted to draw the cane or tubing, and means located in the path of the gripping devices for intermittently actuating the ratchet devices.

6. An apparatus for drawing glass cane or tubing comprising a receptacle containing molten glass, a plurality of gripping devices caused to travel successively up and down with reference to the container and adapted to draw the cane or tubing, cutters located in the path of the grippers and actuated by the grippers to cut the cane glass in sections, a delivery mechanism adapted to receive the sections and deliver same to a receptacle, a cooling or chilling device surrounding the cane glass adjacent the container, and means located in the path of the grippers for simultaneously actuating the delivery mechanism and lowering the cooling device.

7. An apparatus for drawing glass cane or tubing comprising a receptacle containing molten glass, a central standard carrying a continuous conveyer chain, grippers mounted on the chain and actuated by cams on the standard to grip the cane or tubing issuing from the container, cutters mounted on a trunnion and embracing the cane or tubing, a cam on the trunnion engaged by the grippers to simultaneously swing the cutters out of the path of grippers and lock one of the cutters against the tension of a spring in cutting position, a trigger in the path of the grippers for tripping the locked cutter, a receiving and delivery mechanism located in the path of the grippers on their downward path, cams on the standard for tripping the grippers and releasing the severed sections of cane or tubing just before the receiving mechanism is reached, and a sprocket and chain mechanism engaged by each gripper to cause the delivery mechanism to make one complete to and fro movement for delivering the sections to a depository.

8. In an apparatus for drawing glass cane or tubing comprising a receptacle containing molten glass, a plurality of gripping devices adapted to successively travel up and down with reference to the container and draw the molten glass into cane or tubing, cutters mounted on a trunnion and normally embracing the cane or tubing, a cam on the trunnion engaged by the grippers to simultaneously swing the cutters out of the path of the grippers and lock one of the cutters against the tension of a spring in cutting position, a trigger in the path of the grippers for tripping the locked cutter and thereby severing a section of cane or tubing, and a receiving mechanism adapted to receive the severed sections of cane or tubing from the grippers.

9. In an apparatus for drawing glass cane or tubing comprising a receptacle containing molten glass, a plurality of grippers caused to travel successively up and down with reference to the container and adapted to draw the molten glass into cane or tubing, cutters mounted on a trunnion and embracing the cane or tubing, means engaged by the grippers for swinging the cutters out of the way and causing one of the cutters to be locked in cutting position against the tension of an actuating spring, and means in the path of the grippers for tripping the locked cutter and thereby severing the section of cane or tubing and receiving means adapted to receive the sections of cane or tubing from the gripping device.

10. An apparatus for drawing glass cane or tubing comprising a receptacle containing molten glass, a plurality of grippers caused to travel successively up and down with reference to the container and adapted to draw the molten glass into cane or tubing, cutters located in the path of the grippers and actuated thereby to sever the cane or tubing into sections, a receiving and delivery mechanism comprising two parallel arms mounted at their lower ends on a trunnion and having interlocking fingers, means for causing the sections of glass to fall into the receiving arms, and chain and sprocket mechanism engaged by the grippers for causing one complete to and fro swinging movement of the delivery mechanism whereby the sections are delivered to a depository.

11. In an apparatus for drawing glass cane or tubing, the combination of a plurality of gripping devices caused to travel up and down with reference to a molten glass container and adapted to draw the molten glass into cane or tubing with a cutting and breaking apparatus comprising two coöperating cutters embracing the cane or tubing, one of the cutters being adapted to be strained and locked into cutting position against the tension of an actuating spring, and a trigger mechanism located in the path of the grippers for disengaging the locked cutter and thereby severing the cane or tubing into sections.

In witness whereof, we have hereunto set out hands this 26th day of April 1916.

CLEVELAND H. QUACKENBUSH.
JAMES C. SMEDLEY.